(12) United States Patent
Baumann et al.

(10) Patent No.: US 11,906,248 B2
(45) Date of Patent: Feb. 20, 2024

(54) EXHAUST GAS PATH HEAT ENERGY UTILIZATION SYSTEM AND METHOD

(71) Applicant: PTS Power Inc., Hudson, WI (US)

(72) Inventors: Scott Baumann, Hudson, WI (US); Matthew Smith, Forest Lake, MN (US)

(73) Assignee: PTS Power Inc., Hudson, WI (US)

( * ) Notice: Subject to any disclaimer, the term of this patent is extended or adjusted under 35 U.S.C. 154(b) by 29 days.

(21) Appl. No.: 17/864,263

(22) Filed: Jul. 13, 2022

(65) Prior Publication Data

US 2023/0027044 A1 Jan. 26, 2023

Related U.S. Application Data

(60) Provisional application No. 63/221,162, filed on Jul. 13, 2021.

(51) Int. Cl.
*F28D 21/00* (2006.01)
*B01D 53/86* (2006.01)

(52) U.S. Cl.
CPC ....... *F28D 21/001* (2013.01); *B01D 53/8625* (2013.01); *F28D 2021/0022* (2013.01)

(58) Field of Classification Search
CPC ........... F28D 21/001; F28D 2021/0022; B01D 53/8625; B01D 2251/2062
USPC ........................................................ 165/100
See application file for complete search history.

(56) References Cited

U.S. PATENT DOCUMENTS

| | | | | |
|---|---|---|---|---|
| 5,296,206 A | * | 3/1994 | Cho | B01D 53/8631 423/239.1 |
| 5,722,354 A | * | 3/1998 | Sansoucy | F22B 37/244 122/510 |
| RE36,524 E | * | 1/2000 | Tomlinson | F02C 7/16 60/39.182 |

(Continued)

FOREIGN PATENT DOCUMENTS

| | | | |
|---|---|---|---|
| DE | 102011102720 B4 * | 10/2021 | ............. F01K 17/04 |
| EP | 0199186 A1 * | 4/1986 | |

(Continued)

OTHER PUBLICATIONS

International Search Report and Written Opinion, Application No. PCT/US22/37025, dated Oct. 5, 2022, 6 pages.

*Primary Examiner* — Jon T. Schermerhorn, Jr.
(74) *Attorney, Agent, or Firm* — Campbell IP Law LLC; Jason Campbell

(57) ABSTRACT

A method of heating a fluid stream for a power plant comprises diverting a portion of a main flow of flue gas from a power plant at a first pressure (P1), flowing the diverted flue gas through a heat exchanger, flowing an auxiliary fluid stream through the heat exchanger, and transferring heat from the diverted flue gas into the auxiliary fluid stream in the heat exchanger to raise a temperature of the auxiliary fluid stream from a first temperature (T3) to a second temperature (T4), while lowering a first temperature of the diverted flue gas (T1) to a second temperature (T2). The diverted flue gas is then returned to the main flow of flue gas in the power plant at a second pressure (P2). The method of flue gas flow through the heat exchanger may be accomplished by adding a self-contained flow path from a boiler higher pressure (P1) zone to a lower pressure (P2) zone.

20 Claims, 2 Drawing Sheets

(56) References Cited

U.S. PATENT DOCUMENTS

| | | | | |
|---|---|---|---|---|
| 6,125,623 A * | 10/2000 | Cloyd | ............... | F01K 21/047 |
| | | | | 60/39.182 |
| 6,955,051 B2 * | 10/2005 | Marin | ............... | F22B 31/00 |
| | | | | 60/653 |
| 7,588,440 B2 * | 9/2009 | Smith | ............... | F23L 15/04 |
| | | | | 431/11 |
| 7,827,778 B2 * | 11/2010 | Finkenrath | ............ | B01D 53/00 |
| | | | | 60/39.52 |
| 9,746,177 B2 * | 8/2017 | Broderick | ............ | F23J 15/003 |
| 9,995,170 B2 * | 6/2018 | Magee | ............... | F01D 25/10 |
| 10,100,680 B2 * | 10/2018 | Brückner | ............... | F02C 7/224 |
| 10,968,781 B2 * | 4/2021 | Pakkala | ............... | F01D 25/12 |
| 2012/0012298 A1 * | 1/2012 | Taylor | ............... | F23J 15/003 |
| | | | | 165/104.34 |
| 2016/0310892 A1 * | 10/2016 | Badgwell | ......... | H01M 8/04022 |
| 2017/0268379 A1 | 9/2017 | Magee | | |

FOREIGN PATENT DOCUMENTS

| | | | | | |
|---|---|---|---|---|---|
| EP | 0496096 A1 | * | 1/1991 | | |
| GB | 2446595 A | * | 8/2008 | ............... | F02C 3/20 |
| GB | 2541702 A | * | 3/2017 | ............... | F01K 7/18 |
| JP | 5946279 B2 | * | 7/2016 | ............... | F02C 3/34 |
| WO | 2016186512 A1 | | 11/2016 | | |

* cited by examiner

EXHAUST GAS PATH HEAT ENERGY UTILIZATION SYSTEM AND METHOD

This application claims the benefit of U.S. Provisional Application No. 63/221,162 filed Jul. 13, 2021, the entirety of which is hereby incorporated by reference into this application.

BACKGROUND

The present disclosure relates in general to systems and methods for heat exchange in power plants, and more particularly, to efficient heat energy utilization strategies.

Combustion turbines (CT) are widely used in the power generation industry for producing power in a "simple cycle" (exhaust vented directly to the atmosphere) or "combined cycle" configuration using a waste heat recovery steam generator (HRSG) and steam turbine process. Hot gas generated from fossil fuel or hydrogen combustion travels through the confines of the exhaust gas path, transferring waste heat into heat recovery boiler surfaces which may include a selective catalytic reducer (SCR) as in a "combined cycle" arrangement or through an SCR only, without heat transfer boiler surfaces as in a "simple cycle" selective catalyst reduction (SCR) system. One of the pollutants created during the combustion process is a byproduct called oxides of nitrogen (NOx). This pollutant is created in the burning of fossil fuels such as coal and natural gas for various purposes, such as the production of electrical power.

Current methods of emission reduction are the use of catalyst beds located in the gas path for reducing carbon monoxide (CO catalyst) and NOx (SCR catalyst). One known technology to reduce the NOx pollutant is to introduce a diluted vaporized aqueous ammonia reagent of varying initial concentration into the turbine exhaust gas (TEG) flow, just upstream of the SCR catalyst bed using an ammonia injection grid (AIG). The AIG consists of piping typically spanning the width and height of the boiler, closed at one end with rows of small orifices or nozzles. The vaporized ammonia is released into the TEG and is ideally spread evenly across the SCR catalyst bed, reacting with and neutralizing the NOx pollutant.

In order to vaporize the ammonia for this process, a fan-forced dilution air flow is typically delivered at an elevated temperature using various methods known in the art. The ammonia solution is mixed and diluted with the heated air in an ammonia vaporization system and introduced into the primary TEG flow through the AIG as a vaporized ammonia. The dilution air flow is commonly heated according to the following methods.

Ambient air is commonly used, which is pressurized with single speed constant volume blower fans and directed through electric heating elements to raise the temperature of the air flow to levels sufficient for safe and thorough vaporization of the ammonia solution. However, this method is costly due to the high parasitic electrical load required to operate the electric heating elements which could otherwise be used for production or sold to the grid. Further, because the blower fans are constant volume machines, under many circumstances more dilution air than is necessary may be supplied, which requires heating, and is problematic in decreasing ambient temperature conditions. The electric heaters can be maintenance intensive, costly to replace and often underperform in low ambient air conditions (e.g. during cold winter months) which may result in wasteful increased ammonia consumption and which may further contribute to boiler tube surface ammonium bisulfate salt fouling. This is due to the excess ammonia passing through the catalyst bed as "ammonia slip" and accumulating as ammonia salts on downstream heat transfer surfaces. This then leads to significant productivity losses in heat transfer efficiency, as well as an increased combustion turbine back-pressure, contributing to a reduced total plant efficiency and an increase in carbon footprint.

Several methods have been used over time to extract heat energy from a flue gas stream for purposes of auxiliary processes. Commonly used methods include a hot exhaust gas stream pulled from the primary exhaust flow which is already at a sufficiently elevated temperature, using fan suction. Although this method does not typically require any further heating, the hot exhaust is pulled through blower fans, which requires high maintenance of fans and related bearings due to the heat transfer into the fans, and requires large, costly insulated ducting and isolation valves. These fans are relatively large and require more energy than the comparatively smaller ambient blower fans. The hot gas stream also removes heat energy and mass flow out of the primary exhaust gas stream which would otherwise remain in the boiler and transfer heat to the boiler process. This results in reduced steam production and efficiency from the boiler, reducing available energy for a refinery process or steam turbine production.

Much less common is the use of a primary gas path heat exchanger internal to the boiler, where an auxiliary fluid stream is induced (by fans, blowers, pumps), routed into the boiler, and flows through the heat exchanger tube circuit where the heat energy in the flue gas flows across the surfaces. Heat is transferred from the flue gas into the auxiliary stream which raises the temperature of the auxiliary flow. The auxiliary flow remains fully contained in the tube circuit, exits the boiler, and is then forwarded to the desired process. This method exhibits lower maintenance costs, increased reliability of the equipment, and negligible energy draw from the flue gas, leaving more energy for steam and power production. Parasitic electric loads are minimal due to the small fans and motors. However, few boilers use this method due to cost prohibitions and the difficulty of retrofitting such internal systems into existing operational power plants.

All of the aforementioned processes notably suffer from slow start-up times for the SCR catalyst to reach operational temperatures for neutralizing NOx. Many combined cycle power plants must wait a period of time, such as twenty minutes or more, for the SCR catalyst to reach proper operating temperature (i.e. to warm up) before vaporized ammonia can be introduced and emission compliance attained. The SCR is typically located downstream of several banks of boiler tube surfaces where the heat content of the combustion turbine exhaust is first being absorbed to warm-up the upstream tubes and other cold surfaces, leaving little heat left for downstream catalyst warm-up. During the warm-up period, NOx pollutants are exiting the stack, often in excess of mandated limits, and the plant is unable to reach full potential.

SUMMARY

The present disclosure relates to a method and system for efficient heat energy utilization for power plants.

In one aspect, a method of heating an air stream for a power plant comprises diverting a portion of a main flow of flue gas from a power plant at a first pressure (P1), flowing the diverted flue gas through a heat exchanger, flowing an auxiliary fluid stream through the heat exchanger, and transferring heat from the diverted flue gas into the auxiliary fluid stream in the heat exchanger to raise a temperature of the auxiliary fluid stream from a first temperature (T3) to a second temperature (T4), while lowering a first temperature of the diverted flue gas (T1) to a second temperature (T2). The diverted flue gas is then returned to the main flow of flue gas in the power plant at a second pressure (P2).

In another aspect, the auxiliary fluid stream subsequent to the heat exchanger is fed to a catalyst bed within the power plant to accelerate warm-up of the catalyst bed to a sufficient operating temperature.

In another aspect, the auxiliary fluid stream subsequent to the heat exchanger is utilized for dilution and/or vaporization of a reagent.

In another aspect, the auxiliary fluid stream subsequent to the heat exchanger is utilized for power plant air inlet temperature regulation.

DETAILED DESCRIPTION

Figure 1:
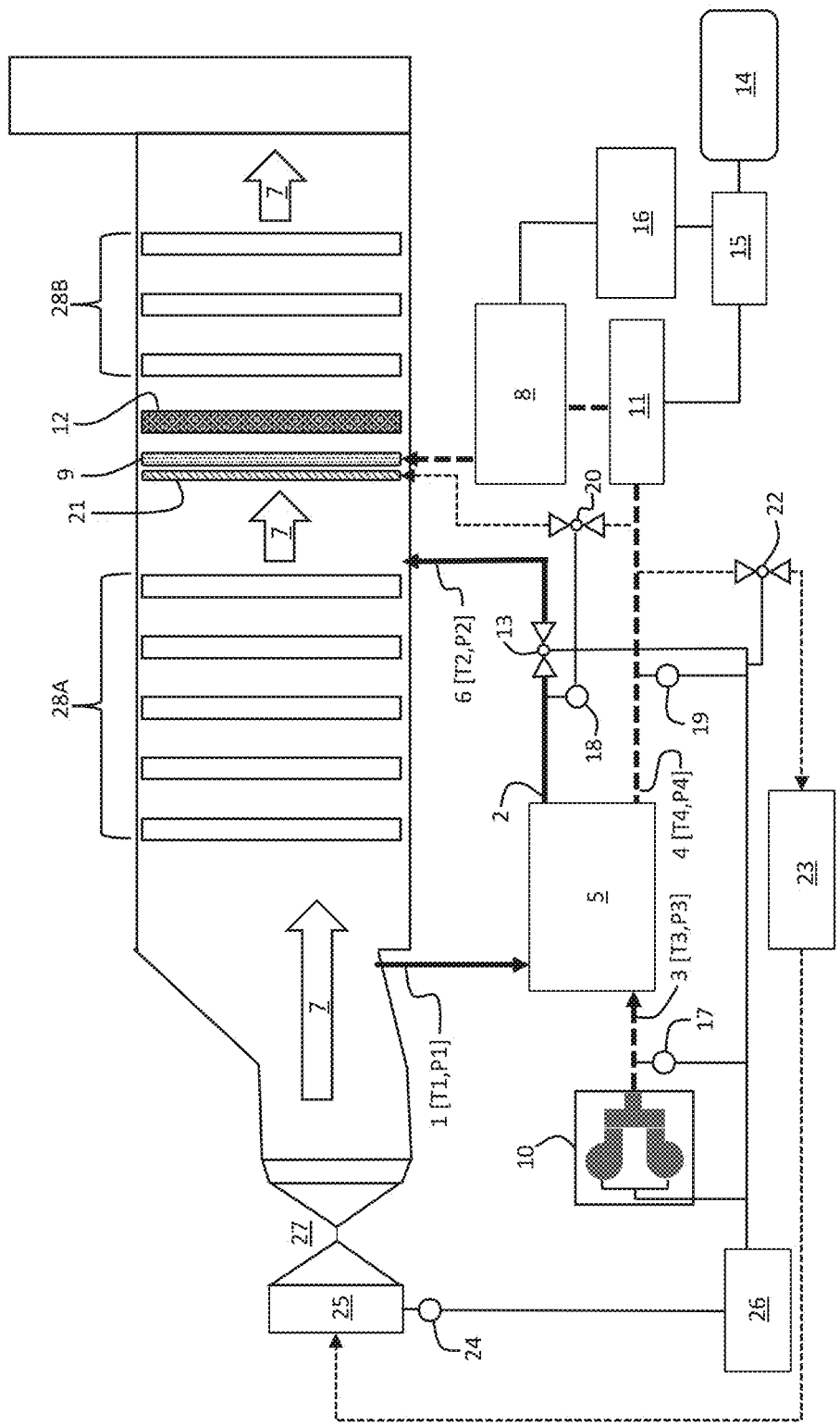
FIG. 1 is a schematic block diagram of a system according to the present disclosure.

An improved system and method is disclosed herein for transferring heat energy from a primary fluid stream (e.g., combustion turbine exhaust gas or other flue gas), to a secondary or auxiliary fluid stream for purposes such as, but not limited to, heating dilution air in order to vaporize ammonia or other reagent used in the reduction of combustion emissions or heating air for purposes of de-icing. The method of the present disclosure uses a heat exchanger with its working flow induced by means of exhaust path differential pressure to transfer heat energy between the two fluid streams, such as gas streams. The two gas streams may be defined as: one primary hot gas (e.g., combustion turbine exhaust, CO combustor or other hot gas flow) and, one auxiliary cold gas (e.g., in this case, but not limited to, ambient air). A small portion of the primary hot stream (e.g., a slipstream) flows through the internally or externally mounted heat exchanger and returns back to the primary gas path flow at a point downstream of the heat exchanger inlet. The hot return pipe or duct can be mounted internally or externally to the primary hot gas path as long as the hot return is located at a point of sufficiently reduced primary hot gas pressure than the hot inlet to maintain a pressure drop sufficient for driving the primary hot gas stream through the system described herein. The heat exchanger can be mounted directly to the hot gas path casing (internal or external), free standing, or otherwise mounted.

The auxiliary fluid cold stream is introduced to the heat exchanger from an outside source (e.g. ambient air), absorbs heat energy from the hot gas stream inside the heat exchanger while remaining unmixed with the primary hot gas stream in the heat exchanger, and then exits the heat exchanger and is subsequently routed to another process, including but not limited to an ammonia vaporization skid, addition of heated air to the turbine inlet for de-icing or turbine performance modification, or to a catalyst bed warm-up system. The motive force inducing the hot gas stream through the heat exchanger is the differential pressure that exists between the hot inlet and the hot return within the confines of the gas path, without any need for an additional mechanism such as a fan or blower to be used. Thus, the system and method of the present disclosure utilizes the inherent pressure drop already present in operating power plants. The cold stream motive force may be induced via external blowers with a flow rate sufficient to the specific process.

In one aspect of the present disclosure, the system and method uses the differential flowing pressure that exists in a boiler or SCR to induce a hot gas stream through a heat exchanger, raising the temperature of a cold auxiliary gas, such as ammonia dilution air for reliable and consistent vaporization. The hot gas is returned back into the primary exhaust stream inside the ductwork at a lower temperature and pressure than at the hot inlet, while the sufficiently heated dilution air is forwarded to the ammonia vaporization system, for example.

In another aspect of the present disclosure, the system and method also allows the heated auxiliary fluid stream to flow through an existing AIG, a specially modified AIG, or dedicated SCR Preheat Manifold and assist in preheating the SCR during start-up of the boiler before introducing vaporized ammonia, resulting in a shorter warm-up period to SCR catalyst operating temperatures. This in turn results in a reduction in NOx emissions during warm-up and enables the power plant to join the grid sooner and be more competitive in the marketplace. In one aspect, a dedicated SCR pre-heat manifold may also be utilized to distribute heat energy for the purpose of accelerating catalyst pre-heating or warm-up. In one example, start-up times for an SCR catalyst can be reduced in relation to prior art power plant systems. Further, NOx emissions during start-up can also be reduced in relation to prior art power plant systems. The auxiliary fluid stream may also feed the diluted and/or vaporized reagent, such as ammonia, to the catalyst bed within the power plant after the auxiliary fluid stream is first used to accelerate warm-up of the catalyst bed to a sufficient operating temperature.

In another aspect of the present disclosure, the system and method also allow the heated auxiliary fluid stream to flow into the air inlet through a dedicated piping system to distribute the heated fluid, such as heated ambient air, across the inlet. Examples purposes for elevating the temperature of the inlet air include but are not limited to de-icing or turbine run profile modification. Current methods for heating inlet air are costly in terms of turbine compressor air loss resulting in lower turbine performance, or other systems that use large amounts of energy to heat air such as independent gas-fired or electric heating systems.

As an example of the auxiliary fluid stream, ambient air may be sourced from either a location outside the power plant, or within a facility or structure housing or associated with the power plant but separate from the turbine exhaust or flue gas, depending on the environmental conditions at the location of the power plant and desired air temperatures. Further, the auxiliary fluid may also be drawn from other sources, such as other exhaust gases, flue gases, or gases or air from other industrial processes, such as available in the near vicinity of the power plant.

Accordingly, the system and method of the present disclosure provides a significant advantage over existing methods by, for example, 1) using the flowing differential pressure inherent to an exhaust system (SCR, boiler, etc.) as the primary motive for inducing a portion of the hot gas exhaust flow through the external or internal heat exchanger, 2) utilizing a heat exchanger external to the gas path for a desired end process using flue gas as the "hot" stream and typically ambient air for the "cold" stream; 3) using the heated dilution air as a means to assist in preheating the SCR catalyst during start-up to reduce the time needed to heat the SCR and reach operating temperatures sooner, thereby lowering NOx emissions and speeding up plant operation, 4) providing heat energy to an air inlet heating system for de-icing or modifying turbine performance run profile, and 5) provide heated air for ammonia vaporization and dilution, such as for NOx reduction processes. Further, with respect to providing heat energy to an air inlet heating system, since ambient air may be the source of the auxiliary fluid stream, this provides a desirable clean air source being introduced into the inlet of the turbine. Other advantages will become apparent with reference to the following disclosure and Figures.

FIG. 1 is a schematic diagram of an example system according to the present disclosure, showing Hot Inlet 1, Hot Outlet 2, Cold Inlet 3, Cold Outlet 4, Heat Exchanger 5, Hot Return 6, Gas Path/Flue Gas/TEG 7, Vaporized Ammonia Balancing Manifold 8, Ammonia Injection Grid 9, Cold Air Blower Skid and Controls 10, Ammonia Vaporization Skid or Ammonia Flow Control Unit (AFCU) 11, Selective Catalyst Reduction (SCR) 12, Hot Return Control Valve 13, Aqueous Ammonia Storage Tank 14, Aqueous Ammonia Pump 15, Existing System Controls 16, Cold Flow Measurement [T,P,Flow] 17, Hot Outlet Flow Measurement [T,P,Flow] 18, Final Cold Measurement [T,P,Flow] 19, SCR Preheat Control Valve 20, SCR Preheat Manifold 21, Inlet Heating Control Valve 22, Inlet Heating Distribution System 23, Inlet Air Conditions [T, P, Frost Point] 24, Air Inlet 25, Main System Controls 26, Gas Turbine 27, and Heat Transfer Surfaces 28A and 28B.

As illustrated in FIG. 1, the system operates by utilizing two fluid streams noted herein as hot (solid line arrow) and cold or auxiliary (dashed line arrow), a heat exchanger 5 external to the gas path proper, and related piping and valves. The hot stream uses a fraction of total flue gas flow energy (turbine exhaust gas 7 in this case) and is diverted from the gas path 7 confines through the hot inlet 1 at a temperature and pressure [T1, P1] into the heat exchanger 5. The portion of the main flow of flue gas diverted from the power plant may be about 500 to about 3000 actual cubic feet per minute [ACFM] diverted from the main flow of flue gas in the power plant. The hot gas transfers heat energy to the cold auxiliary gas entering the heat exchanger 5, flows through the hot return control valve 13, and is returned back into the hot gas path 7 at the hot return 6 [T2, P2]. The hot gas flow is induced by an internal gas path pressure drop (P1-P2).

The hot inlet 1 and hot return 6 could be located at any two points in the gas path where the proper system conditions exist. For example, hot inlet 1 may be located upstream of the catalyst bed 12, whereas for hot return 6, it could be positioned at a second location either upstream of the catalyst bed 12 but downstream from the first location, downstream of the catalyst bed 12, or further downstream of boiler heat transfer surfaces 28B of the flue gas path. Hot inlet 1 may also be located upstream of boiler heat transfer surfaces 28A for higher temperatures (as shown in the example of FIG. 1), or within the zone of heat transfer surfaces 28A for lower temperatures.

The cold auxiliary gas is induced from controlled blower fans 10 and flows into the heat exchanger 5 at the cold inlet 3 [T3, P3]. As the cold gas flows through the heat exchanger, heat energy is transferred from the hot gas into the cold gas. SCR preheat control valve 20 and inlet heating control valve 22 remain closed. The heated cold gas flow exits the heat exchanger at cold outlet 4 [T4, P4], and may flow into the ammonia vaporization skid 11 where it is mixed with the aqueous ammonia solution as ammonia dilution air. From the ammonia vaporization skid 11, the vaporized ammonia flows through the balancing manifold 8, through the ammonia injection grid (AIG) 9, mixes with the turbine exhaust gas (TEG) 7, resulting in a catalytic conversion in the SCR catalyst 12.

Under SCR Preheat conditions, the heated cold gas flow exits the heat exchanger at cold outlet 4 [T4, P4], and may flow into the ammonia vaporization skid 11 with no ammonia flow. From the ammonia vaporization skid 11, the heated dilution air flows through the balancing manifold 8, through the AIG 9, mixes with and adds heat to the TEG 7, resulting in warming the SCR catalyst.

In the case of a dedicated SCR pre-heat manifold 21, the heated cold gas flow exits the heat exchanger at outlet 4 [T4, P4], bypasses the ammonia injection system and flows directly into the SCR pre-heat manifold 21, mixes with and adds heat to the TEG 7, resulting in warming the SCR catalyst.

When the catalyst reaches operating temperature, the SCR pre-heat control valve 20 would close allowing flow to continue through the ammonia system and resume normal operation. In the case inlet air heating is desired, the heated cold gas flow exits the heat exchanger at cold outlet 4 [T4, P4], the inlet heating control valve 22 opens allowing heated air to flow into the inlet air.

Several inlet air conditions are monitored to control the amount of heated air flowing through the system. The cold gas outlet temperature [T4] is modulated by the hot return control valve 13. The hot return valve 13 controls the amount of hot gas flowing through the heat exchanger 5, which varies the available heat energy to transfer into the cold gas. Less mass flow of hot gas equates to lower outlet temperature of the cold gas [T4], and conversely an increased mass flow of hot gas equates to a higher cold gas outlet temperature [T4]. The hot return control valve 13 can be modulated by the system control PLC 16. The system uses its own main controls 26 to actuate control valves, evaluate condition monitoring sensor input, adjust fan speed (if so equipped), and provide output to existing control systems 16.

Examples of a suitable pressure (P1-P4) and temperatures (T1-T4) ranges is shown in the TABLE A below.

TABLE A

| Item | Variable | From | To | Maximum | Minimum |
|---|---|---|---|---|---|
| 1 | T1, Hx Hot Inlet Temperature [F.] | TEG Hot | Hx Hot In | 1520 | 33 |
| 2 | T2, Hx Hot Outlet Temperature [F.] | Hx Hot Out | HRSG Cold | 850 | 33 |
| 3 | T3, Hx Cold Inlet Temperature [F.] | Ambient | Hx Cold In | 120 | −40 |
| 4 | T4, Hx Cold Outlet Temperature [F.] | Hx Cold Out | AFCU | 850 | −40 |
| 5 | P1, Hx Hot Inlet Pressure [in. H2O ga] | TEG Hot | Hx Hot In | 30 | 0 |
| 6 | P2, Hx Hot Outlet Pressure [in. H2O ga] | Hx Hot Out | HRSG Cold | 30 | 0 |
| 7 | P3, Hx Cold Inlet Pressure [in. H2O ga] | Blower Out | Hx Cold In | 100 | 0 |
| 8 | P4, Hx Cold Outlet Pressure [in. H2O ga] | Hx Cold Out | AFCU | 100 | 0 |

A non-limiting example of a suitable pressure range is a P1 of about 15 [in. H2O] and P2 of about 8 [in. H2O], where P1 is the pressure of the flue gas at the entrance of the boiler (maximum pressure), and P2 is an estimated pressure at the upstream face of an SCR catalyst. This gives a ΔP of about 7 [in. H2O] across the heat exchanger 5 hot inlet 1 and return 6 with a fully open hot return control valve 13. The hot gas pressure and flow are modulated by the hot return control valve 13 through the heat exchanger 5. System pressures (P1, P2, P3, P4) will vary depending on the type of process, equipment, boiler, flue gas source and other equipment. In addition to configuring the relative locations of hot inlet 1 and hot return 6, hot return control valve 13 may also be utilized to control or modulate the sufficient differential pressure motive force to drive the flow of the diverted flue gas through the heat exchanger and return it to the main flow of flue gas in the power plant. A typical total gas side pressure drop of about 15-20 [in. H2O] is a normal range for a larger system with a maximum of about 30 [in. H2O]. Pressure P3 is compressed ambient air typically delivered by low pressure blowers delivered to the system at about 35 [in H2O], with a total range of about 1-100 [in. H2O]. Mass flow rates are typically about 2000-6000 SCFM. Pressure P4 is the delivered process pressure at or below P3 of about 35 [in. H2O].

Inlet temperature (T1) depends on the flue gas source and load. 1200 F is a typical inlet temperature but ranges up to 1520 F maximum based on the material of the heat exchanger 5. Temperature T2 at the outlet of the hot return control valve 13 also is dependent on the system conditions and can range from about 33-1520 F (cold start to maximum temperature). Cold side temperature (T3) is compressed ambient air, which typically ranges from about −40 to 120 F. Temperature T4 is the delivered process stream and is targeted to a typical range of about 500-650 F, with a typical material maximum of about 850 F. Higher grade alloy piping can be used to allow increased temperature ranges. Flowing the cold auxiliary fluid stream through the heat exchanger is operated with a variable and controlled flow volume and pressure to achieve the target operating pressures and temperatures for downstream processes, including but not limited to ammonia vaporization, catalyst pre-heating and turbine inlet de-icing or other run modifications.

A suitable heat exchanger and related piping according to the present system and method may be manufactured from various materials that would allow the system to be used with a multitude of heat and chemical environments, but preferably is made of stainless steel, for example.

The pressure motive force configured between P1 and P2 is ideally optimized such that a minimum amount of energy (BTUs) is drawn from the hot diverted flue gas in the heat exchanger 5 to meet the required temperature specification of a subsequent use for the heated cold air flow T4, such as air inlet 25 temperature regulation, reagent vaporization or dilution at the AFCU skid 11 for example, and catalyst bed 12 warm-up as described herein.

Power plants may create a cyclonic flow of flue gas downstream of the turbine, and accordingly additional configurations may be utilized to ensure sufficient drive of flue gas through the hot inlet 1. For example, where hot inlet 1 connects to the ductwork or wall of the flue gas path, a scoop or similar device may be positioned around or relative to the hot inlet 1 orifice to facilitate capture or direction of flue gas into the inlet orifice, which may take advantage of some of the kinetic energy in the flow of the flue gas itself to help drive the hot flue gas through the system, in addition to any pressure drop utilized across hot inlet 1 and hot return 6.

Further, depending on the nature of the cyclonic flow or other characteristics of flue gas flow within the ductwork of the power plant (e.g., turbulence, low and high pressure zones, etc.), the hot inlet 1 orifice may be optimally positioned at a location in connection with the ductwork where the flow of flue gas into the inlet is promoted or sufficient to drive it through the system.

Figure 2:
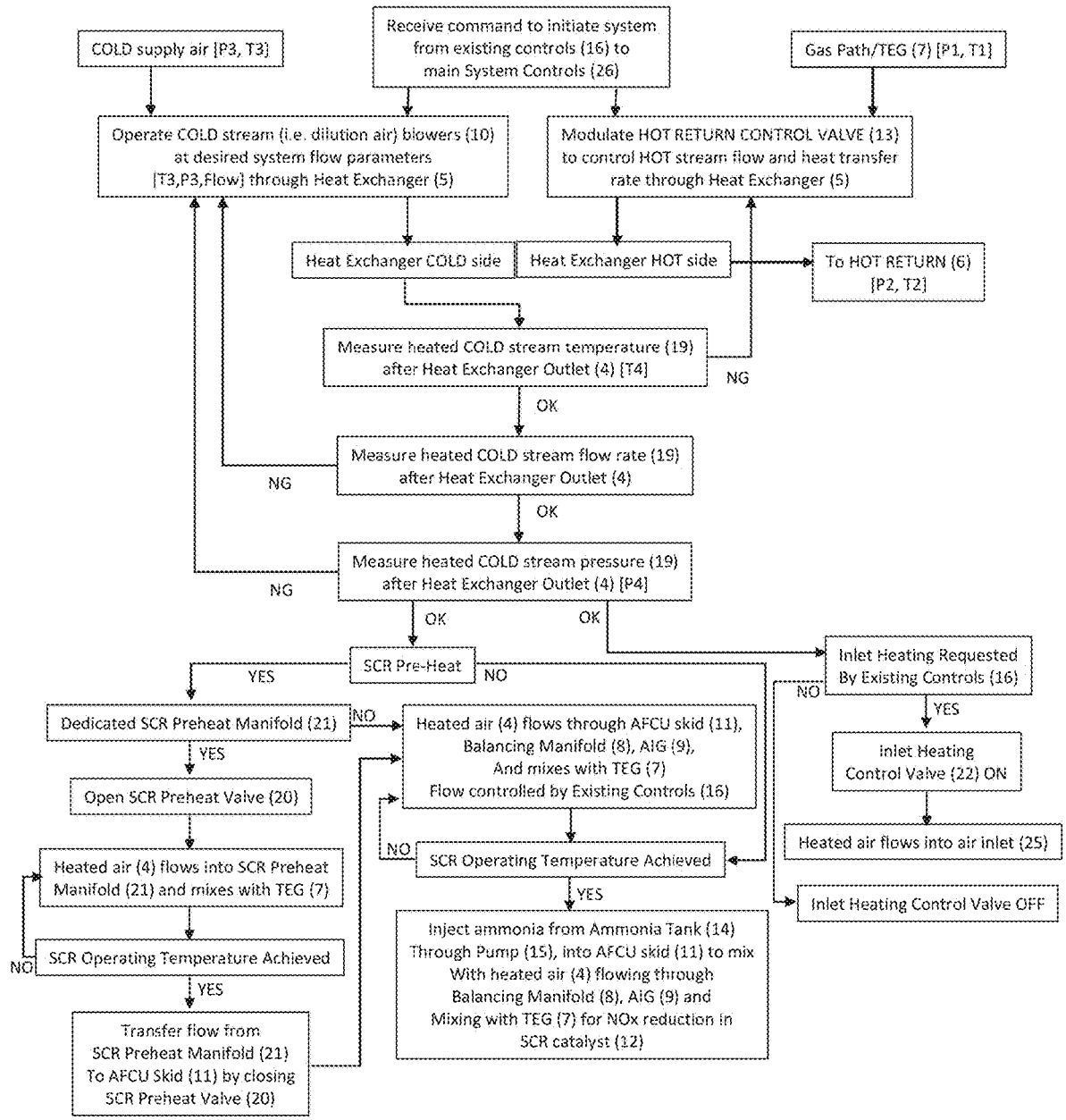
FIG. 2 is a process flow chart showing an example process of operating the system of FIG. 1 according to the present disclosure.

FIG. 2 is a process flow diagram according to the present disclosure, showing a description and flow of example processes of operating the system and components shown in FIG. 1 and as also described above, wherein "NG" stands for "no good".

Accordingly, it may be appreciated that the system and method of the present disclosure offers numerous advantages over the prior art, including but not limited to: 1) reducing operating as well as capital expenses and risk by reducing auxiliary fluid heating system complexity; 2) reducing auxiliary stream electrical and mechanical equipment; 3) eliminating maintenance of electric heaters and large hot gas fans, 4) improving the efficiency of a heating an auxiliary fluid stream by providing consistent fluid flow and temperature regardless of ambient conditions; 5) eliminating or reducing parasitic electrical losses; 6) reducing the SCR warm-up period; 7) providing for or improving efficiency of ammonia vaporization and/or air inlet de-icing systems and processes or modifying turbine performance run profile. An additional advantage of the present system and method is that it may be retrofitted with pre-existing systems already in use at a power plant, thereby offering redundant systems in the case of a failure of either system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of heating a fluid stream for a power plant comprises:
   diverting a portion of a main flow of flue gas from a power plant at a first pressure (P1);
   flowing the diverted flue gas through a heat exchanger;
   flowing an auxiliary fluid stream through the heat exchanger;
   transferring heat from the diverted flue gas into the auxiliary fluid stream in the heat exchanger to raise a temperature of the auxiliary fluid stream from a first temperature (T3) to a second temperature (T4), while lowering a first temperature of the diverted flue gas (T1) to a second temperature (T2);
   returning the diverted flue gas to the main flow of flue gas in the power plant at a second pressure (P2).

2. The method of claim 1, further comprising wherein the first pressure of the diverted flue gas (P1) is higher than the second pressure (P2) of the diverted flue gas, and a sufficient differential pressure motive force to drive the flow of the diverted flue gas through the heat exchanger and return it to the main flow of flue gas in the power plant is controlled.

3. The method of claim 1, further comprising wherein the heat exchanger is located external to the flue gas path.

4. The method of claim 1, further comprising wherein the difference between the first pressure (P1) and the second pressure (P2) is at least about 1.5 [in. H2O].

5. The method of claim 1, further comprising wherein the first temperature of the auxiliary fluid stream (T3) is between about −40 to 120 [F] and the second temperature of the auxiliary fluid stream (T4) is between about −40 to 850 [F], and the first temperature of the diverted flue gas (T1) is between about 33 to 1520 [F] and the second temperature of the diverted flue gas (T2) is between about 33 to 850 [F].

6. The method of claim 1, further comprising wherein the portion of the main flow of flue gas diverted from the power plant is about 500 ACFM to about 3000 ACFM.

7. The method of claim 1, wherein flowing the auxiliary fluid stream through the heat exchanger comprises a variable and controlled flow volume and pressure.

8. The method of claim 7, further comprising adjusting the auxiliary fluid stream variable and controlled flow volume and pressure according to the required specification of a use selected from the group consisting of: air inlet temperature regulation, reagent vaporization or dilution, and catalyst bed warm-up.

9. The method of claim 2, further comprising configuring an inlet of the diverted flue gas to utilize kinetic energy of the main flow of flue gas to further drive the flow of the diverted flue gas through the heat exchanger and return it to the main flow of flue gas in the power plant.

10. The method of claim 2, further comprising wherein the auxiliary fluid stream subsequent to the heat exchanger at second temperature T4 is fed to a catalyst bed within the power plant to accelerate warm-up of the catalyst bed to a sufficient operating temperature.

11. The method of claim 10, wherein the start-up time of the catalyst bed is reduced by about 8 to 12 minutes.

12. The method of claim 2, further comprising wherein the auxiliary fluid stream subsequent to the heat exchanger at second temperature T4 is utilized for dilution and/or vaporization of a reagent.

13. The method of claim 12, further comprising wherein the auxiliary fluid stream feeds the diluted and/or vaporized reagent to a catalyst bed within the power plant.

14. The method of claim 13, further comprising wherein the reagent is ammonia and the catalyst bed is used for reducing NOx emissions from the main flow of the flue gas.

15. The method of claim 13, further comprising wherein the auxiliary fluid stream feeds the diluted and/or vaporized reagent to the catalyst bed within the power plant after the auxiliary fluid stream is first used to accelerate warm-up of the catalyst bed to a sufficient operating temperature.

16. The method of claim 2, further comprising optimizing the pressure motive force between P1 and P2 such that a minimum amount of energy (BTUs) is drawn from the flue gas in the heat exchanger to meet the required specification of a use selected from the group consisting of: air inlet temperature regulation, reagent vaporization or dilution, and catalyst bed warm-up.

17. The method of claim 2, further comprising wherein the sufficient differential pressure motive force to drive the flow of the diverted flue gas through the heat exchanger and return it to the main flow of flue gas in the power plant is controlled using a control valve or fixed or variable orifice.

18. The method of claim 2, wherein the power plant comprises a catalyst bed, and wherein the portion of the main flow of flue gas is diverted from a first location upstream of the catalyst bed, and the diverted flue gas is returned to the main flow of flue gas in a flue gas path at a second location upstream of the catalyst bed but downstream from the first location.

19. The method of claim 2, wherein the power plant comprises a catalyst bed, and wherein the portion of the main flow of flue gas is diverted from a first location upstream of the catalyst bed, and the diverted flue gas is returned to the main flow of flue gas in a flue gas path at a second location downstream of the catalyst bed.

20. The method of claim 2, wherein the power plant comprises a catalyst bed, and wherein the portion of the main flow of flue gas is diverted from a first location upstream of the catalyst bed, and the diverted flue gas is returned to the main flow of flue gas in the power plant at a second location downstream of a boiler heat transfer surface of the flue gas path.

\* \* \* \* \*